United States Patent
Moberg et al.

[11] Patent Number: 5,808,725
[45] Date of Patent: Sep. 15, 1998

[54] ILLUMINATION CONTROL SYSTEM FOR A FILM SCANNER

[75] Inventors: Gregory Oscar Moberg, Rochester; Allen Davenport Bellinger, Webster, both of N.Y.

[73] Assignee: Eastman Kodak Company, Rochester, N.Y.

[21] Appl. No.: 721,147

[22] Filed: Sep. 27, 1996

[51] Int. Cl.$^6$ .................................................. G03B 27/72
[52] U.S. Cl. ................................ 355/67; 347/246; 348/97
[58] Field of Search .................................. 355/67, 69, 35, 355/38; 250/205, 559.39; 348/97; 358/509; 347/236, 246

[56] References Cited

U.S. PATENT DOCUMENTS

| | | | |
|---|---|---|---|
| 4,092,530 | 5/1978 | Wise | 250/205 |
| 4,746,987 | 5/1988 | Traino et al. | 358/285 |
| 4,814,791 | 3/1989 | Ohara et al. | 346/108 |
| 5,514,864 | 5/1996 | Mu-Tung et al. | 250/205 |
| 5,528,288 | 6/1996 | Sandor et al. | 348/97 |

*Primary Examiner*—Safet Metjahic
*Assistant Examiner*—John Chizmar
*Attorney, Agent, or Firm*—Francis H. Boos, Jr.

[57] ABSTRACT

In a telecine film scanner having an aperture area setting servo loop to establish output light intensity in response to commanded light intensity settings followed by operation of a lamp current intensity servo loop during film scanning at the established aperture area position, the affect of the aperture area setting on the lamp current intensity servo loop gain is compensated for by means of a gain compensation circuit in the current intensity servo loop that operates to make the current intensity servo loop gain reciprocally proportional to the commanded light intensity settings, at least for settings above a minimum threshold setting. Any input gain adjustments, such as for different film types, in the commanded light intensity signal applied to the lamp current intensity servo loop are additionally compensated for by a reciprocal gain adjustment in the servo loop.

5 Claims, 3 Drawing Sheets

ILLUMINATION CONTROL SYSTEM FOR A FILM SCANNER

FIELD OF THE INVENTION

The invention relates generally to an illumination system for a film scanner and, more particularly, feedback control of illuminant intensity in a telecine film scanner.

BACKGROUND OF THE INVENTION

Commonly assigned U.S. Pat. No. 5,528,288 Sandor et al., the disclosure of which is incorporated herein by reference, discloses an illumination control system for a telecine film scanner that utilizes dual intensity error servo loops, one of which controls an aperture mechanism for coarse illumination changes such as might be required between scene changes in a film strip and the other of which controls lamp current to maintain constant illumination intensity during ensuing frame scanning functions.

Referring to FIG. 1 herein, corresponding to FIG. 5 in the '228 patent, an illumination control system of the type described above is shown. A Xenon arc lamphouse 14 supplies a light beam 21, through an aperture formed by the leading edges of blades 35 and 37 of aperture mechanism 33, to a light integrating cylinder 80 for film illumination. A portion of the light within the integrating cylinder 80 is fed by an optical fiber 81 to a photo detector 83 which provides a current signal that is converted to a voltage proportional to "measured light intensity" by current-to-voltage conversion circuit 82. The measured light intensity voltage level is compared in summation circuit 84 with a reference voltage proportional to "commanded light intensity" to create an "intensity error" signal on lines 86 and 88 representing the difference between the two signals. The intensity error signal is applied on lines 86 and 88, respectively, to the intensity integrator and lamp current control circuit 90 and the aperture blade control and drive circuit 92. However, only one of the control circuits 90 or 92 is activated to provide a controlled response to the intensity error signal in any given state of operation.

During the aperture change state, the aperture blade control and drive unit 92 is active to complete an aperture servo loop that is operative to drive the intensity error signal on line 88 towards zero, by positioning of the aperture blades 35,37 in response to a "drive current" on line 96 until the difference between the measured light intensity voltage and the commanded light intensity voltage is less than a specified error theshold level, i.e., "close enough" to zero. During this operation, the intensity integrator and lamp control unit 90 is rendered insensitive to the intensity error signal on line 86 by the lamp discrete control on data bus 110 and responsive to a reference voltage level 94 to hold the lamp current from power supply 15 at a constant level. In the interval of one film frame scan (nominally 33 milliseconds), the new aperture opening position is achieved and the absolute blade position is captured (stored) in aperture blade control and drive block 92.

The illumination intensity and control logic 100 provides the commanded light intensity signal that is related to the film type and to the scene change commands stored in reference to the film image frames being scanned and also provides the lamp and aperture discrete controls on data buses 110 and 120, respectively.

Once the aperture mechanism 33 is parked at its new position, the intensity integrator and lamp control 90 is rendered responsive to the intensity error signal on line 86 to complete a lamp current intensity servo loop that modulates lamp current developed by the power supply 15 around a nominal operating value (e.g. 18 amps), set by the reference voltage 94, in order to reduce the integral of the intensity error signal on line 86 to zero. Simultaneously, but separately, the aperture blade control and drive circuit 92 utilizes the blade position sensor information or "position" signal on line 62 from position sensor 60 to counter disturbances in blade position which may arise from shock, vibration or drift in the blade position so that it remains at the aperture position previously set in the aperture change state for ensuing frame scanning operation.

During film frame scanning state, with the aperture area fixed and the lamp current controlled by the lamp current intensity servo loop, it was found that that the latter servo loop was subject to unstable operation at larger aperture area settings. Typically, it would be desirable to set the loop gain as high as possible to optimize control of the lamp current in response to noise conditions. Attempts to compensate the loop gain by using a stepped gain amplifier in the line 86 to reduce the loop gain as aperture area settings were increased proved unsuccessful at higher commanded light intensity settings which might be required by telecine users for certain types of film being scanned. Additionally, for intermediate ranges of lamp intensity settings, the discrete gain changes afforded by the stepped gain amplifier over successive ranges of commanded light intensity settings resulted in undesired compromises between response to noise conditions and protection against unstable operation.

Accordingly, there arises a need for an improved lamp intensity servo loop gain compensation arrangement that will maintain high loop gain to preserve optimum response to noise conditions and at the same time prevent the illumination control system from becoming unstable, i.e. oscillating.

SUMMARY OF THE INVENTION

In accordance with the invention, therefore, there is provided an improved illumination control system for a telecine scanner having an illumination source; a controlled light aperture mechanism, means for supplying digital code values representing settings of commanded light intensity to be used in scanning a sequence of film image frames; an aperture area intensity servo loop for adjusting said aperture mechanism to a scanning light intensity determined by said commanded light intensity; and a lamp current intensity servo loop holding lamp intensity for said illumination source at a predetermined value during scanning of said film image frames. The improvement of the invention comprises gain compensation means, included in said lamp current intensity servo loop, for providing gain compensation in said lamp current intensity servo loop that is reciprocally proportional to said settings of commanded light intensity above a predetermined value. The gain of the lamp current intensity servo loop is thereby compensated for any changes in loop gain caused by adjustments to said aperture mechanism in arriving at said scanning light intensity determined by said commanded light intensity.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
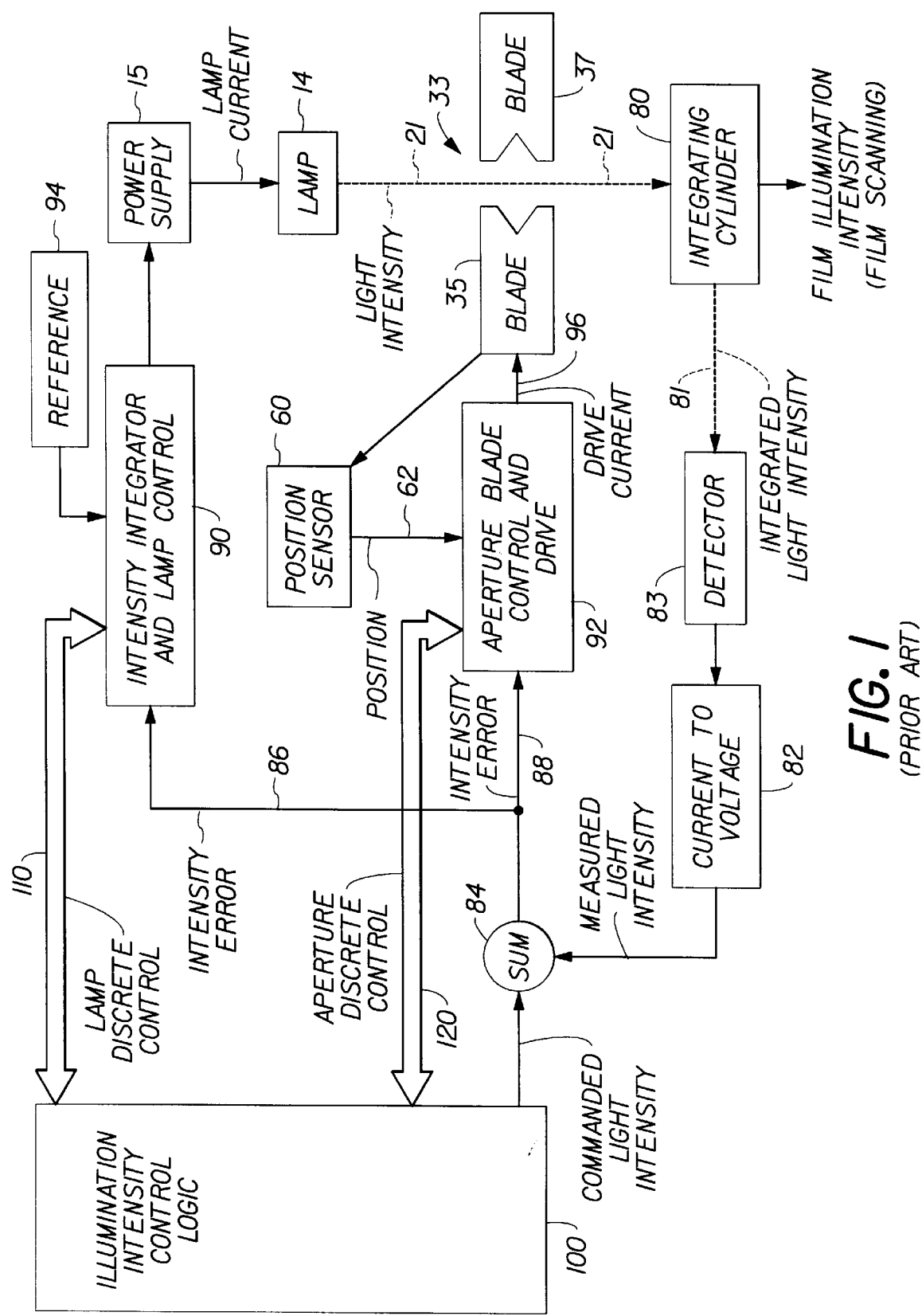
FIG. 1 is a block diagram of an illumination control system of the type disclosed in aforementioned U.S. Pat. No. 5,528,288.
Figure 2:
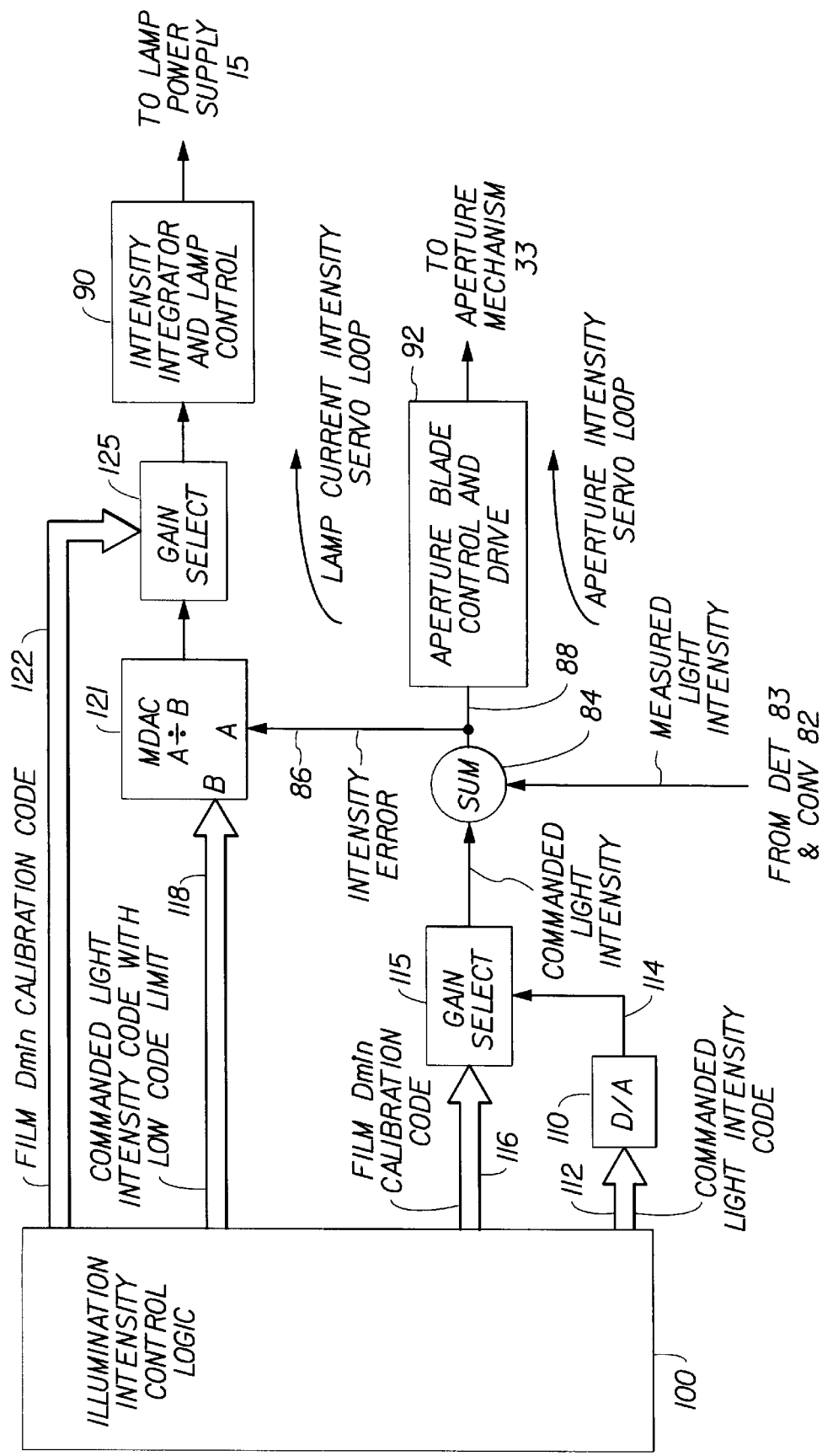
FIG. 2 is a block diagram illustrating improvements according to the present invention in the illumination control system of FIG. 1.

Referring to FIG. 2, a portion of the lamp control system of FIG. 1 is shown in which like elements are assigned the same reference numerals. As in the case of the system of FIG. 1, the aperture servo loop, including aperture blade control and drive 92, is operative in response to the commanded light intensity signal input to summing circuit 84 during the aperture state to reposition the aperture blades during transitions between scenes so as to drive the intensity error voltage on line 88 within a specified error band. During the ensuing film frame scanning state, the lamp current intensity servo loop, including the intensity integrator and lamp control unit 90, is operative to drive the intensity error voltage signal on line 86 to zero by adjusting the lamp current through the integrator in unit 90.

Maintaining the best possible performance of the lamp current intensity servo loop, as measured by noise rejection, requires that the loop gain be kept as high as possible while maintaining loop stability, i.e. avoiding oscillatory conditions. Consideration of the lamp current intensity servo loop gain shows that the loop gain is proportional solely to the commanded light intensity signal into the summing junction 84 although it is believed to be not intuitively obvious why this is so. It can be shown however, that since the Xenon lamp operates optimally at a given nominal current, small variations around its operating point will have the same servo loop gain independent of the lamp intensity. The output of the servo loop is scaled up or down by multiplying this lamp intensity by the appropriate aperture area, which is directly proportional to the intensity code times any input intensity code scaling gain. Thus since the light output intensity correction is made by varying the lamp current, any variations in the lamp current intensity servo loop gain results solely from positioning of the aperture blades (aperture area control) which is determined solely by the inputted commanded light intensity code and any intensity code scaling gain included in the makeup of the commanded light intensity signal input to summing circuit 84.

An example of intensity code scaling gain included in the commanded light intensity signal to summing circuit 84 is given in FIG. 2 by the inclusion of a digitally controlled gain select amplifier 115 used to provide a selectable gain applied to the commanded light intensity signal to adjust system control for different film types being scanned. Different gains are required to calibrate a fixed intensity commanded light intensity input code on bus 112, e.g. 200 H, to correspond to full scale video level for the various selections of film Dmin and corresponding color correcting filter transmissions. The basic commanded light intensity code representing a commanded shift in system light intensity output is provided on bus 112 to a digital to analog converter 110 which generates a control voltage on line 114 applied to one input of gain select amplifier 115. A two bit code representing one of four possible film Dmin calibration codes is provided on bus 116 to the other input of gain select amplifier 115 to provide an appropriate gain applied to the commanded light intensity voltage signal to summation circuit 84. This is an optional but desirable feature in the operation of the overall illumination control system but, as noted above, its inclusion has an modifying affect on the system's servo loop gain basically established by the commanded light intensity code supplied from illumination intensity control logic 100 on bus 112. It will be appreciated that the number of code bits applied is dependent on the number of different film dependent variables employed, e.g. for cases where fewer or more than four filters are employed.

In the embodiment illustrated in FIG. 2, the basic improvement of the present invention is provided by the inclusion in the lamp current intensity servo loop of gain compensation means including a multiplying digital to analog converter 121 for providing gain compensation in the lamp current intensity servo loop that is reciprocally proportional to the settings of commanded light intensity. Converter 121 with inputs suitably connected operates to divide the intensity error by a digital code setting supplied from logic unit 100 on bus 118, thus producing a compensation in the error signal which is the reciprocal of the code settings. The bus 118 code settings are the same as those on bus 112 except that, in the illustrated embodiment, the bus 118 settings are limited to a low code threshold limit determined by the operating characteristics of the MDAC 121. In the illustrated embodiment the compensation commanded intensity settings and the control settings are provided by means of digital code values supplied by a digital logic unit 100. It will be appreciated, however, that one skilled in the art may construct a purely analog system in which the commanded light intensity settings comprise analog input voltages and thus the system of the invention is not limited to digital input code settings.

Figure 3:
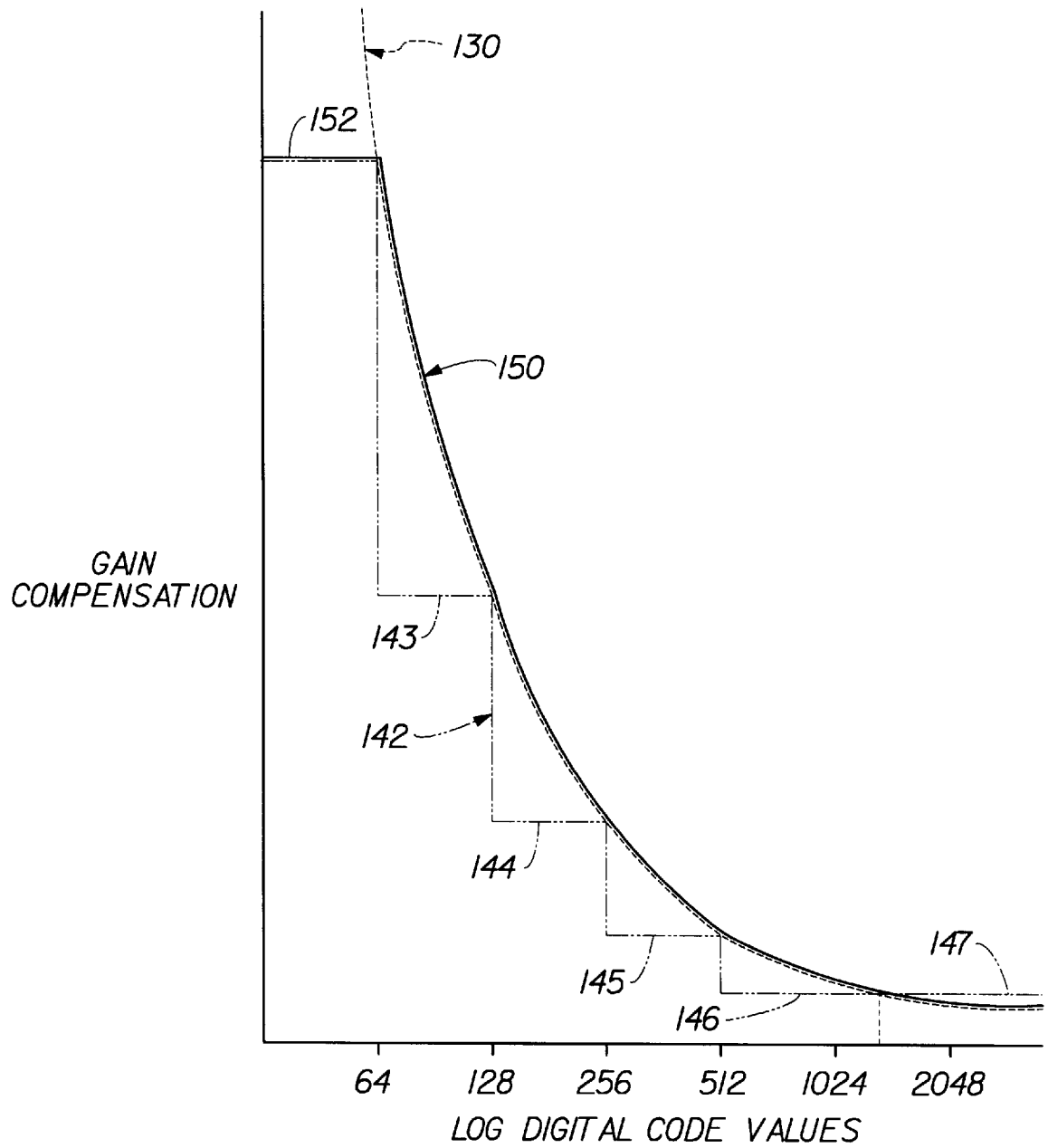
FIG. 3 is a graph showing a lamp intensity feedback loop gain compensation characteristic in accordance with the present invention.

Referring to FIG. 3, there is shown a graph illustrating an ideal gain compensation characteristic curve 130, shown in dotted line, and plotted as a function of log digital code values for the commanded light intensity codes on bus 112. The stepped curve 145, shown in dash-dot line, represents the prior effort, described above, to achieve gain compensation by means of a step gain amplifier. In this prior implementation, only five levels of gain compensation are selected at four different commanded light intensity code settings. As a consequence, optimum operation of the lamp current intensity servo loop would occur at only five settings of commanded intensity code values 64, 128, 256, 512, and 1024 on the horizontal axis. For intervening code settings between these values, corresponding to gain compensations 143–146, the servo loop would operate at less than optimum gain resulting in inability to respond effectively to noise. Above the code value corresponding to the intersection of level 147 with the ideal compensation curve 130, the system would operate with excess gain resulting in operating instability manifested by oscillation in the light intensity.

Curve 150 represents the gain compensation of the present invention which is made reciprocally proportional to the commanded light intensity code settings. For the MDAC 121, the reciprocity is effective for all code settings above a threshold value, e.g. 64 and below this level is constant at 152. This threshold is determined primarily by the noise and bandwidth characeristics of the MDAC circuit 121 when operating at the high gains occurring at low code values. Other known reciprocating circuits may be used which are equally capable of operating below this code threshold value. As can be seen, by controlling the gain compensation to be directly reciprocally proportional to the commanded intensity code settings, the gain compensation can be set equal to the ideal gain compensation curve thereby avoiding operation of the servo loop in regions that represent gain inadequate to give desired noise immunity or with excessive gain that would cause instability and oscillation.

As noted above, the commanded light intensity signal to summing circuit 84 may optionally include the effect of gain select circuit 115. To compensate for this effect on the gain of the lamp current intensity servo loop, a digitally controlled reciprocal gain select circuit 125 is provided between MDAC 121 and the input to intensity integrator and lamp control 90. The error signal from MDAC 121 is gain adjusted by a two digit code value supplied from logic unit 100 on bus 122, this two bit code selecting gains equaling the reciprocals of the scaling gains 115 selected by bus 116. The code values applied to reciprocal gain select circuit 125 may be the same as the code values on bus 116 or may be modified to account for the type of gain select circuit employed as determined by the system designer. The net combined effect of the gain select circuit 115 and the reciprocal gain select circuit 125 is a constant value, e.g. "1" which does not adversely vary the gain of the servo loop at different commanded light intensity settings.

The invention has been described with reference to a preferred embodiment. However, it will be appreciated that variations and modifications can be effected by a person of ordinary skill in the art without departing from the scope of the invention.

PARTS LIST

14 Xenon arc lamp house
15 lamp power supply
21 light beam
33 aperture mechanism
35,37 aperture blades
60 aperture position sensor
62 position sensor feedback line
80 light integrating cylinder
81 optical fiber
82 current to voltage converter
83 photo detector
86,88 intensity error signal lines
90 intensity integrator and lamp control
92 aperture blade control and drive
94 lamp current reference source
100 illumination intensity control logic
110 lamp discrete control bus
112 commanded light intensity code bus
120 aperture discrete control bus
125 digitally controlled gain select circuit
115 digitally controlled gain select amplifier
114 commanded light intensity control voltage line
116 digital data bus
121 multiplying digital to analog converter
122 digital data bus
118 commanded light intensity code bus
130 ideal gain compensation curve
145 stepped gain compensation curve

What is claimed is:

1. An improved illumination control system for a telecine scanner having an illumination source; a controlled light aperture mechanism, means for supplying digital code values representing settings of commanded light intensity to be used in scanning a sequence of film image frames; an aperture area intensity servo loop for adjusting said aperture mechanism to a scanning light intensity determined by said commanded light intensity; and a lamp current intensity servo loop holding lamp intensity for said illumination source at a predetermined value during scanning of said film image frames; the improvement comprising:

gain compensation means, included in said lamp current intensity servo loop, for providing gain compensation in said lamp current intensity servo loop that is reciprocally proportional to said settings of commanded light intensity.

2. The improved illumination control system of claim 1 including means for supplying selected digital film calibration codes representing predetermined film characteristics for a plurality of different film types to be scanned;

means responsive to said selected first codes for applying corresponding selected gains to said commanded light intensity;

and reciprocal gain adjustment means included in said lamp current intensity servo loop and responsive to said selected calibration digital codes for reciprocally compensating for effects on lamp current intensity loop gain caused by said selected gains applied to commanded light intensity.

3. The improved illumination control system of claim 1 wherein:

said lamp current intensity servo loop includes a means for comparing said settings of commanded light intensity with measured scanning light intensity to produce an intensity error signal; and said gain compensation means comprises a multiplying digital to analog converter for dividing said intensity error signal by gain compensating digital code values corresponding to said digital code representing settings of commanded light intensity.

4. The illumination control system of claim 3 wherein said gain compensation means is effective to provide gain compensation only above a predetermined threshold value of commanded light intensity settings.

5. A method of operating an illumination control system for a telecine scanner, the control system being of the type having an illumination source; a controlled light aperture mechanism, means for supplying digital code values representing settings of commanded light intensity to be used in scanning a sequence of film image frames; an aperture area intensity servo loop for adjusting said aperture mechanism to a scanning light intensity determined by said commanded light intensity; and a lamp current intensity servo loop holding lamp intensity for said illumination source at a predetermined value during scanning of said film image frames; the method comprising the step of:

providing gain compensation in said lamp current intensity servo loop that is reciprocally proportional to said settings of commanded light intensity.

* * * * *